United States Patent
Maryamchik et al.

(10) Patent No.: US 8,114,359 B2
(45) Date of Patent: Feb. 14, 2012

(54) SNCR DISTRIBUTION GRID

(75) Inventors: Mikhail Maryamchik, Copley, OH (US); Gary L. Anderson, Duncansville, PA (US); Jeffrey Hahn, Ebensburg, PA (US); Richard A. Ramsdell, Carrolltown, PA (US)

(73) Assignee: Babcock & Wilcox Power Generation Group, Inc.

( * ) Notice: Subject to any disclaimer, the term of this patent is extended or adjusted under 35 U.S.C. 154(b) by 655 days.

(21) Appl. No.: 11/577,171

(22) PCT Filed: Nov. 10, 2005

(86) PCT No.: PCT/US2005/041125
§ 371 (c)(1),
(2), (4) Date: Nov. 12, 2008

(87) PCT Pub. No.: WO2006/053281
PCT Pub. Date: May 18, 2006

(65) Prior Publication Data
US 2009/0060806 A1 Mar. 5, 2009

(51) Int. Cl.
*B01D 53/56* (2006.01)

(52) U.S. Cl. ......... 422/310; 261/115; 239/132; 422/172

(58) Field of Classification Search .................. 422/310, 422/168, 172, 200, 147; 261/115; 122/511; 165/177, 178; 239/129, 132
See application file for complete search history.

(56) References Cited

U.S. PATENT DOCUMENTS

| | | | |
|---|---|---|---|
| 4,115,515 A * | 9/1978 | Tenner et al. | 423/235 |
| 4,220,613 A * | 9/1980 | Nakajima et al. | 261/152 |
| 4,809,621 A | 3/1989 | Materna et al. | |
| 4,992,085 A | 2/1991 | Belin et al. | |
| 5,098,680 A * | 3/1992 | Fellows et al. | 423/235 |
| 5,343,830 A | 9/1994 | Alexander et al. | |
| 5,836,257 A * | 11/1998 | Belin et al. | 110/245 |
| 6,454,824 B1 * | 9/2002 | Maryamchik et al. | 55/434.4 |
| 2005/0063887 A1 * | 3/2005 | Arrol et al. | 423/235 |

* cited by examiner

Primary Examiner — Jill Warden
Assistant Examiner — Joye L Woodard
(74) Attorney, Agent, or Firm — Eric Marich

(57) ABSTRACT

An SNCR distribution grid for introducing a NOx reducing reactant into a flue gas flow. The grid is made of one or more elements which are formed by fluid-cooled tubes to which membrane pieces are attached, preferably by welding, to form conduits in between the tubes. The fluid-cooled tubes may be cooled by water and/or steam and the distribution grid is disposed in the flue gas flow. To admit the reactant into the flue gas, nozzles are provided in the membrane and the reactant is conveyed from a location external of the furnace or combustor enclosure, into the conduits so formed, and thence out into the Flue gas flow via the nozzles.

1 Claim, 2 Drawing Sheets

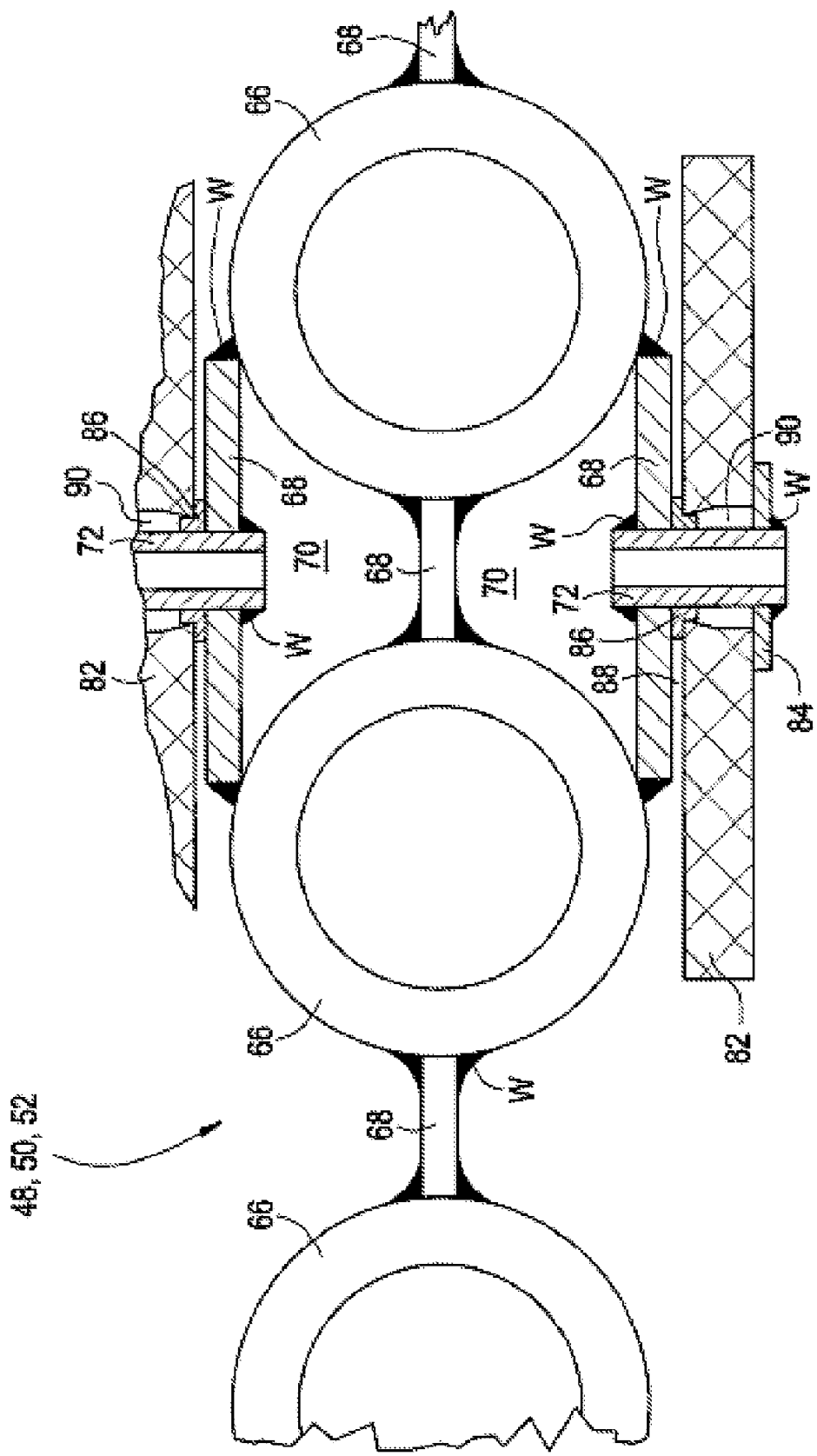

SNCR DISTRIBUTION GRID

FIELD OF THE INVENTION

The present invention relates primarily to circulating fluidized bed (CFB) reactors, combustors and/or boilers having impact type particle separators used in the production of steam for industrial applications and/or utility power generation and, more particularly, to an apparatus for introducing ammonia or urea into the flue gas produced by such CFBs which, as part of a selective non-catalytic reduction (SNCR) system, is used to reduce NOx emissions from the CFB. The present invention may also be employed in connection with bubbling fluidized bed reactors, grate-type furnaces, etc.

BACKGROUND OF THE INVENTION

The typical operating temperature for the reactors or combustors of such CFBs, and thus the flue gases produced thereby, lies within a temperature range of approximately 1550-1650°F. This temperature range thus lies within an acceptable temperature "window" for the application of selective non-catalytic reduction (SNCR) techniques for reducing NOx emissions, since SNCR systems and their associated apparatus typically involve the introduction of a specific reactant into flue gases whose temperature lies within a temperature range of approximately 1400-2000° F. In SNCR, a reducing agent or reactant, typically ammonia or urea, is sprayed into the furnace flue gas for reducing NOx according to one of the following reactions, depending upon the reactant employed:

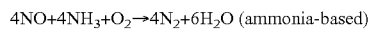
$4NO+4NH_3+O_2 \rightarrow 4N_2+6H_2O$ (ammonia-based)

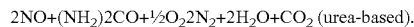
$2NO+(NH_2)2CO+\frac{1}{2}O_2 2N_2+2H_2O+CO_2$ (urea-based).

SNCR is frequently used in CFB boilers which employ cyclone(s) for separating solids from the flue gas leaving the furnace to reduce NOx emissions. In such applications, the aforementioned reactant is sprayed at the inlet or outlet of the cyclone utilizing the high gas turbulence associated with the cyclone for mixing the flue gas with the reactant. These spray locations also take advantage of a relatively small cross-sectional flow area of the cyclone inlet or outlet, thereby allowing sufficient penetration of the jets of reactant into the flue gas flow to provide more uniform mixing of the reactant into the flue gas.

In contrast to the CFBs described above, another type of CFB reactor, combustor and/or boiler (hereinafter referred to as a CFB boiler for convenience) employs low velocity, impact-type particle separators, such as U-beams, for separating solids from the flue gas leaving the furnace and features a relatively large cross-sectional flow area for the flue gas flow. Utilizing nozzles to inject such reactants for SNCR which are installed only on the periphery of walls of the CFB which convey the flue gas flow might not achieve sufficient jet penetration of the reactant into the flue gas flow, resulting in poor mixing of the reactant with the flue gas.

SUMMARY OF THE INVENTION

One aspect of the present invention is drawn to an SNCR distribution grid for delivering a reactant for reducing NOx into a gas stream containing NOx. At least one element for conveying the reactant from a source outside of the gas stream is provided. The element has at least one nozzle for spraying the reactant from a conduit defined within the element into the gas stream. The conduit being formed by at least two fluid-cooled tubes and membranes located in-between the tubes, the at least one nozzle being located in at least one of the membranes.

The various features of novelty which characterize the invention are pointed out with particularity in the claims annexed to and forming a part of this disclosure. For a better understanding of the invention, its operating advantages and he specific benefits attained by its uses, reference is made to the accompanying drawings and descriptive matter in which preferred embodiments of the invention are illustrated.

BRIEF DESCRIPTION OF THE DRAWINGS

In the Figures:

FIG. 5 is a close-up, sectional view of a third embodiment of an individual element used in the present invention.

DESCRIPTION OF THE PREFERRED EMBODIMENTS OF THE INVENTION

The present invention overcomes the aforementioned difficulty by providing a particularly designed distribution grid for introducing the reactant into the flue gas flow. The grid comprises one or more elements which are formed by fluid-cooled tubes to which membrane pieces are attached, preferably by welding, to form conduits in between the tubes. The fluid-cooled tubes may be cooled by water and/or steam and the distribution grid is disposed into the flue gas flow. To admit the reactant into the flue gas, nozzles are provided in the membrane and the reactant is conveyed from a location external of the furnace or combustor enclosure, into the conduits so formed, and thence out into the flue gas flow via the nozzles. The spacing between the elements forming the distribution grid, as well as the spacing between the nozzles provided in the membrane is selected to achieve relatively uniform mixing of the dispersed reactant into the flue gas. As described above, the inlet to the conduits which convey the reactant into the flue gas is located outside of the furnace enclosure where it would be connected to a reactant feed line connected to a source of the reactant. Suitable valves and control devices would be provided in the reactant feed line to control the introduction of the reactant into the flue gas according to any particular control scheme desired by the operators of the CFB installation.

Preferably, the distribution grid can be placed at one or more of several locations: upstream of the impact type particle separators or U-beams, between the one or more rows of such U-beams, or downstream of the U-beams with respect to a direction of flue gas flow. An advantage of locating the distribution grid upstream of the impact type particle separator(s) is that the separator(s) can enhance the subsequent mixing of the reactant with the flue gas. A disadvantage of locating the distribution grid at this upstream location is that there is a higher solids loading in the Flue gas upstream of the separator(s) which could hamper penetration of the reactant jet into the flue gas. These factors would thus need to be considered when the desired location of the distribution grid is to be finalized.

Figure 1:
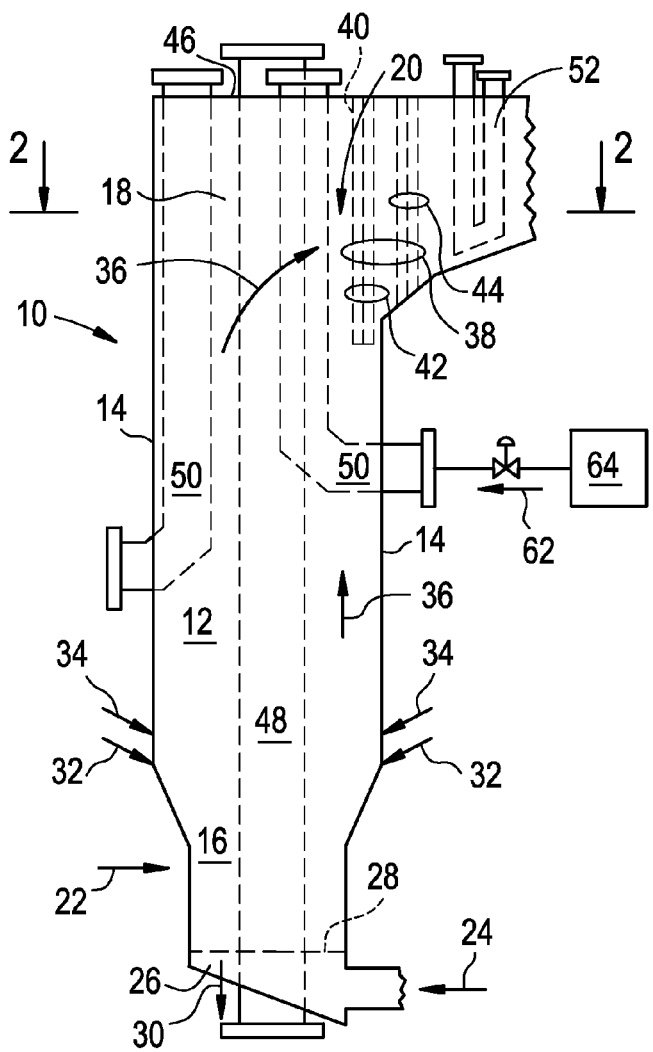
FIG. 1 is a sectional side view of a typical CFB boiler to which the present invention may be applied.

Referring to the drawings annexed to and forming a part of this disclosure, wherein like reference numerals designate the same or functionally similar elements throughout the several drawings, and to FIG. 1 in particular, there is shown a sectional side view of a typical CFB boiler 10 having a furnace or reactor enclosure 12, typically rectangular in cross-section, defined by fluid-cooled enclosure walls 14. The enclosure walls 14 are typically tubes separated from one another by a steel membrane to achieve a gas-tight enclosure 12. The reactor enclosure 12 has a lower portion 16, an upper portion 18, and an exit opening 20 located at an outlet of the upper portion 18. Fuel, such as coal, and sorbent, such as limestone, schematically indicated at 22, are provided to the lower portion 16 in a regulated and metered fashion by any conventional means known to those skilled in the art. By way of example and not limitation, typical equipment that would be used includes gravimetric feeders, rotary valves and injection screws. Primary air, indicated at 24, is provided to the lower portion 16 via windbox 26 and distribution plate 28 connected thereto. Bed drain schematically indicated at 30 removes ash and other debris from the lower portion 16 as required, and overfire air supply ports 32, 34 supply the balance of the air needed for combustion.

A flue gas/solids mixture 36 produced by the CFB combustion process flows upwardly through the reactor enclosure 12 from the lower portion 16 to the upper portion 18, transferring a portion of the heat contained therein to the fluid cooled enclosure walls 14. A primary, impact type particle separator 38 is located within the upper portion 18 of the reactor enclosure 12. In a preferred embodiment, the primary, impact type particle separator 38 comprises several rows of U-beams 40 which may be arranged in two groups; an upstream group 42 and a downstream group 44 U-beams 40 may be supported from roof 46 of the reactor enclosure 12, as disclosed in U.S. Pat. Nos. 4,992,085 and 5,343,830, or they may be supported by cooled tubes as disclosed in U.S. Pat. No. 6,454,824, the entire texts of which are hereby incorporated by reference as though fully set forth herein.

The furnace enclosure 12 of the CFB reactor 10 may be provided with division wall heating surface 48, wing wall heating surface 50, or both types of heating surface, depending upon the steam generation requirements of the given CFB installation. In some installations, neither type of surface may be required for steam generation requirements. In addition, there will be provided downstream superheater heating surface 52, as shown.

Figure 2:
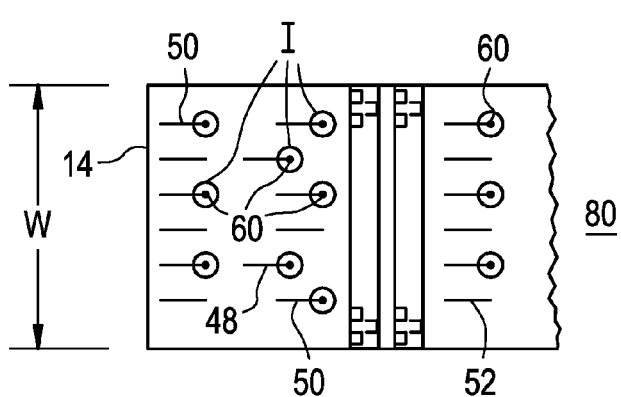
FIG. 2 is a sectional plan view of the CFB boiler of FIG. 1, viewed in the direction of arrows 2-2.

Referring to FIG. 2, which is a sectional view through the upper portion 18, there are illustrated several locations where individual elements 60 can be located and used to inject a reactant 62 supplied by an SNCR system 64 (schematically illustrated in FIG. 1), and which collectively form a distribution grid 80. As shown, the elements 60 may be located on the division wall heating surface 48, the wing wall heating surfaces 50, and/or the superheater heating surface 52. While FIG. 2 shows the preferred location as being on what can be referred to as the "trailing edges" of any of these heating surfaces, this is not essential and the elements 60 can be located anywhere, including being on the surfaces 48, 50 and/or 52, and in single or multiple locations on the surfaces 48, 50 and/or 52. Further, while we have described the present invention as a distribution grid, it will be appreciated that certain applications may require only a single element 60 with a single nozzle 72. Conversely, a plurality of elements 60 may be employed on one or several of the surfaces 48, 50 and/or 52 across a width W of the CFB boiler 10, and at various locations spaced along any such surface 48, 50 and/or 52, so that the reactant 62 is injected into the flue gas at many locations across a cross-section of the flue passage conveying the flue gas.

Figure 3:
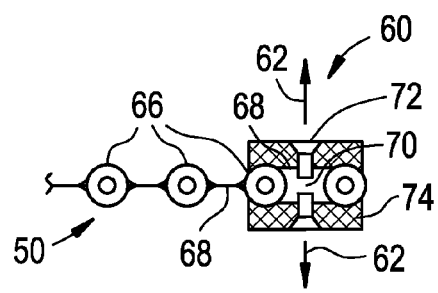
FIG. 3 is a close-up, sectional view of a first embodiment of an individual element used in the present invention.
Figure 4:
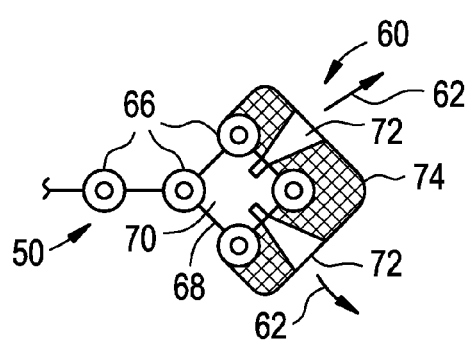
FIG. 4 is a close-up, sectional view of a second embodiment of an individual element used in the present invention.

FIGS. 3 and 4 are close-up views of two preferred embodiments, designated I in FIG. 2, of an individual element 60 containing a conduit 70. Solely for ease of illustration, and not in any way limiting the application of the elements 60 according to the present invention, assume the elements 60 are formed as part of a wing wall heating surface 50, comprised of fluid-cooled tubes 66, some or all of which may be connected to one another by membrane 68. In FIG. 3, the elements 60 are formed by two pieces of membrane 68 extending in between two adjacent fluid-cooled tubes 66, thereby creating a conduit 70 therein which is used to convey the reactant 62 from a source thereof to one or more apertures or nozzles 72 for injecting the reactant 62 into the flue gas. The apertures or nozzles 72 may be comprised of small pieces of tube or pipe or a more particularly designed shape as dictated by jet penetration and/or pressure drop requirements. If required for erosion resistance and/or heat absorption reduction, the elements 60 may be provided with a coating of refractory 74, as shown. In FIG. 4, a larger conduit 70 may be employed, if required by the quantity of reactant 62 which must be conveyed along any individual conduit 70, by increasing the number of fluid-cooled tubes 66 used to form the conduit 70, with an associated increase in the number of membrane pieces 68 as shown.

Alternatively, and as shown in FIG. 5, protective tiles 82 may be employed instead of refractory 74 to protect the membrane 68 as well as the tubes 66 adjacent thereto. The protective tiles 82 may be made of any suitable high-temperature and erosion-resistant material such as ceramics or metals such as stainless steel. The protective tiles 82 may be attached to the membrane 68 by any suitable means, such as by fastening the tiles 82 to the nozzle 72 with a washer 84 welded, as at W, to the nozzle 72. A spacer or washer 86 may be employed to position the tiles 82 relative to the nozzle 72 and to provide a gap 88 between the tile 82 and the membrane 68 for reducing heat absorption by the membrane 68. The protective tile 82 may thus be provided with an aperture 90 for this purpose, the aperture 90 being such that it will accept the nozzle 72. If there is an appreciable difference in the diameter of the aperture 90 and the outside diameter of the nozzle 72 which would be inserted into the aperture 90, the spacer or washer 86 may also be provided with a portion which would also extend around the outside diameter of the nozzle 72 and within the aperture 90 to prevent excessive movement of the protective tile 82 during operation. The protective tiles 82 between locations on the elements 60 where the nozzles 72 are provided may be similarly attached to the membrane 68; of course, at these locations the nozzles 72 would be replaced by simple pins since no reactant 62 is provided or supplied into the flue gas 36 at these intermediate locations.

While specific embodiments of the invention have been shown and described in detail to illustrate the application of the principles of the invention, those skilled in the art will appreciate that changes may be made in the form of the invention covered by the following claims without departing from such principles. For example, the present invention may be applied to new construction involving circulating fluidized bed reactors or combustors, or to the replacement, repair or modification of existing circulating fluidized bed reactors or combustors. It may be applied in non-CFB applications, as well, such as in bubbling fluidized bed boilers or furnaces.

In addition, while the distribution grid has been shown as being located in the vicinity of the exit opening, and/or just upstream or downstream thereof, it may be desirable to locate the distribution grid at other locations within the furnace enclosure or flues downstream of the exit opening, where appropriate temperatures of the flue gas may be presented at certain load ranges which require NOx reduction. In some embodiments of the invention, certain features of the invention may sometimes be used to advantage without a corresponding use of the other features. Accordingly, all such changes and embodiments properly fall within the scope of the following claims.

What is claimed is:

1. An SNCR distribution grid for delivering a reactant for reducing NOx into a gas stream containing NOx, comprising:
at least one element for conveying the reactant from a source outside of the gas stream, the element having at least one nozzle for spraying the reactant from a conduit defined within the element into the gas stream, the conduit being formed by at least two fluid-cooled tubes and membranes located in-between the tubes, the at least one nozzle being located in at least one of the membranes, the at least one element being provided with a protective tile, the protective tile provided with a spacer to provide a gap between the protective tile and the at least one membrane for reducing heat absorption by the membrane, the spacer provided with a portion which extends around an outside diameter of the at least one nozzle and a portion which extends within an aperture in the protective tile to prevent excessive movement of the protective tile during operation.

* * * * *